June 16, 1964 P. A. LEPELLETIER 3,137,370
VEHICLE BRAKE CONTROL AND BALANCING SYSTEM
Filed March 8, 1962 8 Sheets-Sheet 2

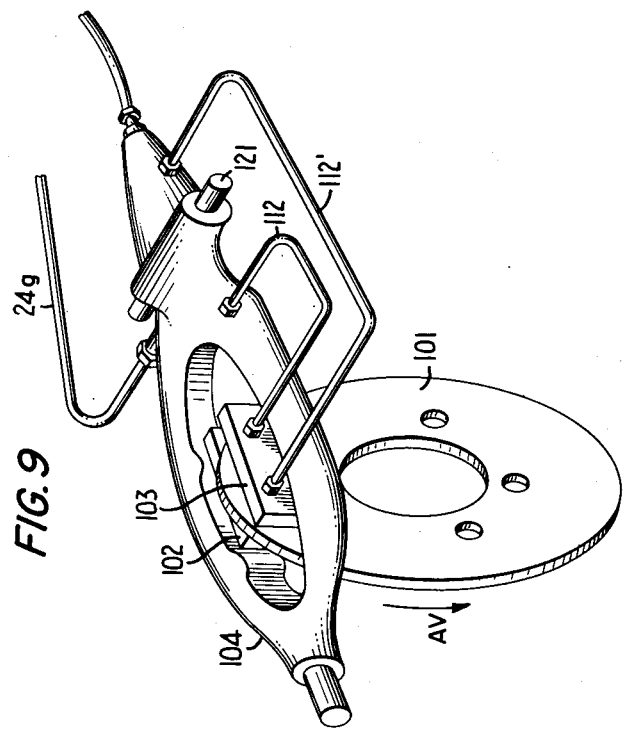
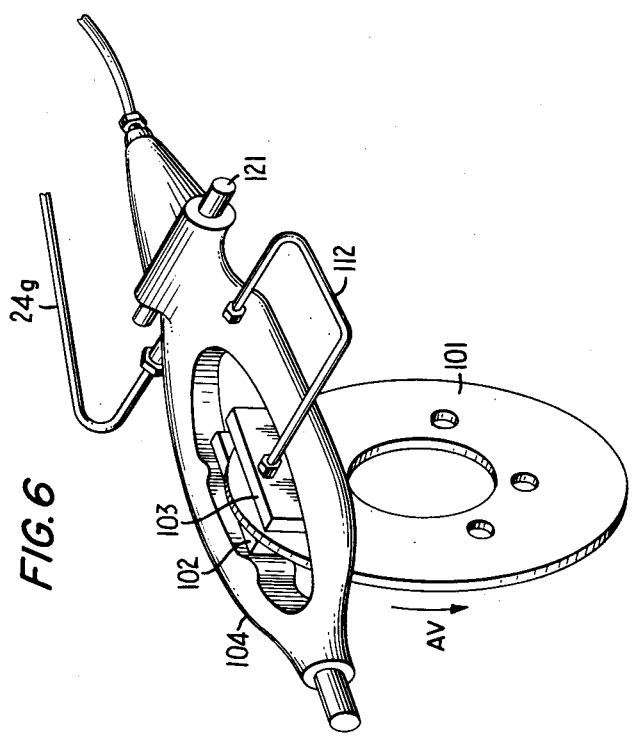

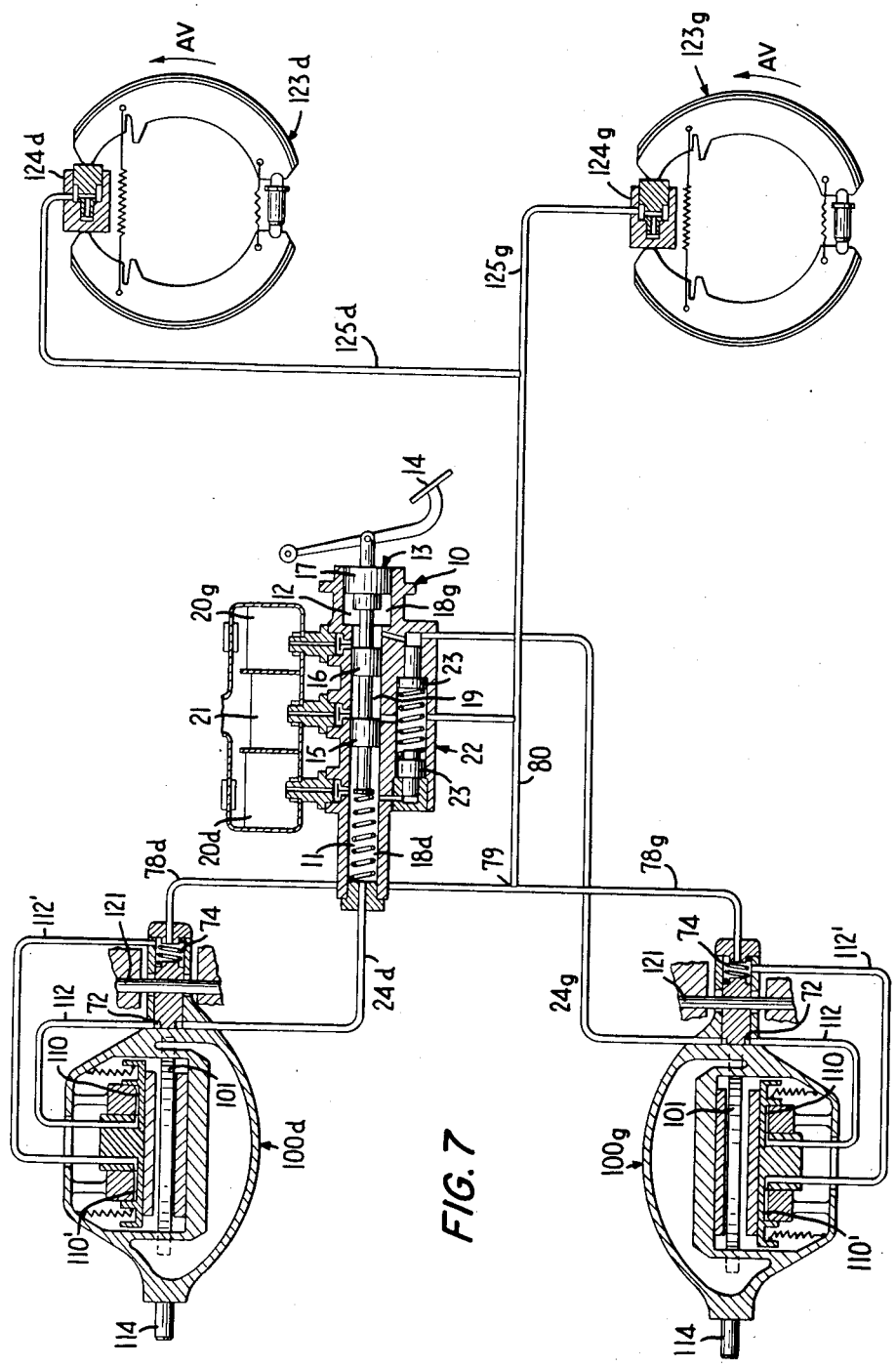

United States Patent Office 3,137,370
Patented June 16, 1964

3,137,370
VEHICLE BRAKE CONTROL AND BALANCING SYSTEM
Pierre André Lepelletier, Chatou, France, assignor to Societe Anonyme Francaise du Ferodo, Paris, France, a corporation of France
Filed Mar. 8, 1962, Ser. No. 178,292
Claims priority, application France Mar. 2, 1962
7 Claims. (Cl. 188—152)

This is a continuation-in-part of my co-pending application Serial No. 643,735, filed on March 4, 1957, and now Patent 3,933,324 and of my co-pending application Serial No. 765,808 filed on October 7, 1958 and now Patent 3,044,581.

In the above-mentioned applications, there have been described arrangements of master-cylinders and/or brake cylinders, and/or drum brakes, in which each brake cylinder comprises a primary chamber and a secondary chamber co-operating with a primary piston and a secondary piston respectively, a rotating drum, two brake shoes co-operating frictionally with the drum, each shoe having one extremity applied against one of the pistons respectively, a master-cylinder driving equal volumes of fluid into the primary chambers, and a secondary balancing circuit coupling together the two secondary chambers.

These arrangements, while permitting a balanced braking to be obtained, are mainly applicable to brakes with drums and shoes which are adapted by means of the actual construction of the brake, of recording and deriving the reactor forces resulting from braking for the purpose of balancing the said forces.

In addition to the brakes with drums and shoes of the kind described in the above-mentioned applications, there exist numerous other types of brakes in which the construction does not inherently lend itself to the extraction of the reaction forces.

The present invention has for its object a vehicle brake control and balancing system which makes it possible to adapt the balancing of the reactions in particular to such other brakes, by virtue of means which are external to the construction itself of the brakes.

According to the invention, instead of positively fixing to the chassis the supports of the friction elements co-operating with a rotating member rigidly fixed to the wheel, the above means consist in providing a substantially movable assembly of the supports with respect to the chassis, in such manner as to take-off the reaction forces by means of the movements of the supports. These means further comprise compensating chambers which are intended to react on the supply of the brake cylinders by the effect of the movements of the supports with respect to the chassis, so as to ensure a controlled pressure modulation capable of effecting the balancing.

The invention is also applicable, not only to brakes with drums and shoes of the type described in the above-mentioned applications, that is to say having an internal reactive sensitivity, but also to all other brakes of any type whatsoever, for example brakes of conventional construction with or without internal reactive sensitivity, brakes of the disc type without reactive sensitivity, etc.

More particularly, according to the invention, a braking device for two wheel brakes of an axle of an automobile vehicle comprises: a chassis, two supports movably-mounted with respect to the chassis in two predetermined directions, preferably parallel, supporting means between the supports and the chassis and having balancing means which, when they are active, make equal and opposite all displacements of the supports with respect to the chassis two rotating members fast for rotation with the two wheels respectively, two friction means carried by the two supports and co-operating frictionally with the two rotating members respectively, two brake cylinder means carried by the two supports and controlling the two friction means respectively, the supports bearing against the chassis through intermediary balancing means in response to the gripping action of the friction means on the rotating members, two supply conduits coupled to the two brake cylinder means respectively, two compensating chambers respectively coupled to the said conduits, each compensating chamber being formed between a cylinder member and a piston member slidably-mounted in the cylinder member, one of the members being coupled to the chassis and the other to the corresponding support, and a master-cylinder actuated by the user and driving equal volumes of fluid into the said conduits.

If the coefficient of friction is the same for the two brakes, the forces are symmertical in pairs and the pressures are the same in the two brake cylinders. The movable supports take-up symmetrical positions.

In general, the coefficient of friction will not be the same for the two brakes. If the coefficient of friction is for example greater on the right-hand side than on the left, the movable support of the right-hand brake has a tendency to carry out a small movement in the direction of rotation of wheel and, through the intermediary balancing means will force the movable support of the left-hand brake to carry out a small equal movement in the opposite direction.

During the course of these small movements, owing to the fact that the pressure applies a small reaction in each compensating chamber in the direction of braking, small variations of capacity appear in the compensating chambers and consequently in the supply conduits of the brake cylinders. The capacity available to the oil of the right-hand brake increases by a small amount, and the capacity available to the oil of the left-hand brake diminishes by the same small amount.

As the volumes of oil enclosed in the supply conduits of the brake cylinders are invariable since the master-cylinder has driven equal volumes into these conduits, and also since all communication between these conduits is prevented, these small variations of capacity produce reverse variations of pressure. The pressure on the right-hand side thus becomes smaller than the pressure on the left-hand side.

By virtue of this arrangement, an excellent balancing of the braking is obtained. In addition, since oil is an incompressible fluid, very large variations of pressure are produced by very small variations of capacity. This makes it possible to give the moving support of each of the two brakes a perfectly stable position of equilibrium which is always very close to the precise symmetrical position, and this remains true irrespective of the two supply pressures of the brake-cylinders.

In one form of embodiment of the invention, the supporting and balancing means consist of two secondary chambers which are formed between the cylinder members and the piston members opposite the compensating chambers, and which are coupled to each other by a closed balancing circuit. In an alternative construction, the supporting and balancing means consist of a mechanical compensator bar pivoted on the chassis and coupled at its extremities to the two moving supports.

The objects, special features and advantages of the invention will further be brought out in the description which follows below of forms of embodiment selected by way of example with reference to the accompanying drawings, in which:

FIG. 6 shows a perspective view of the disc brake of FIG. 5;

FIG. 7 is a diagrammatic view similar to that of FIG. 4, but relating to another alternative form;

Fig. 9 is a perspective view of the disc brake of FIG. 8;

Figure 1:
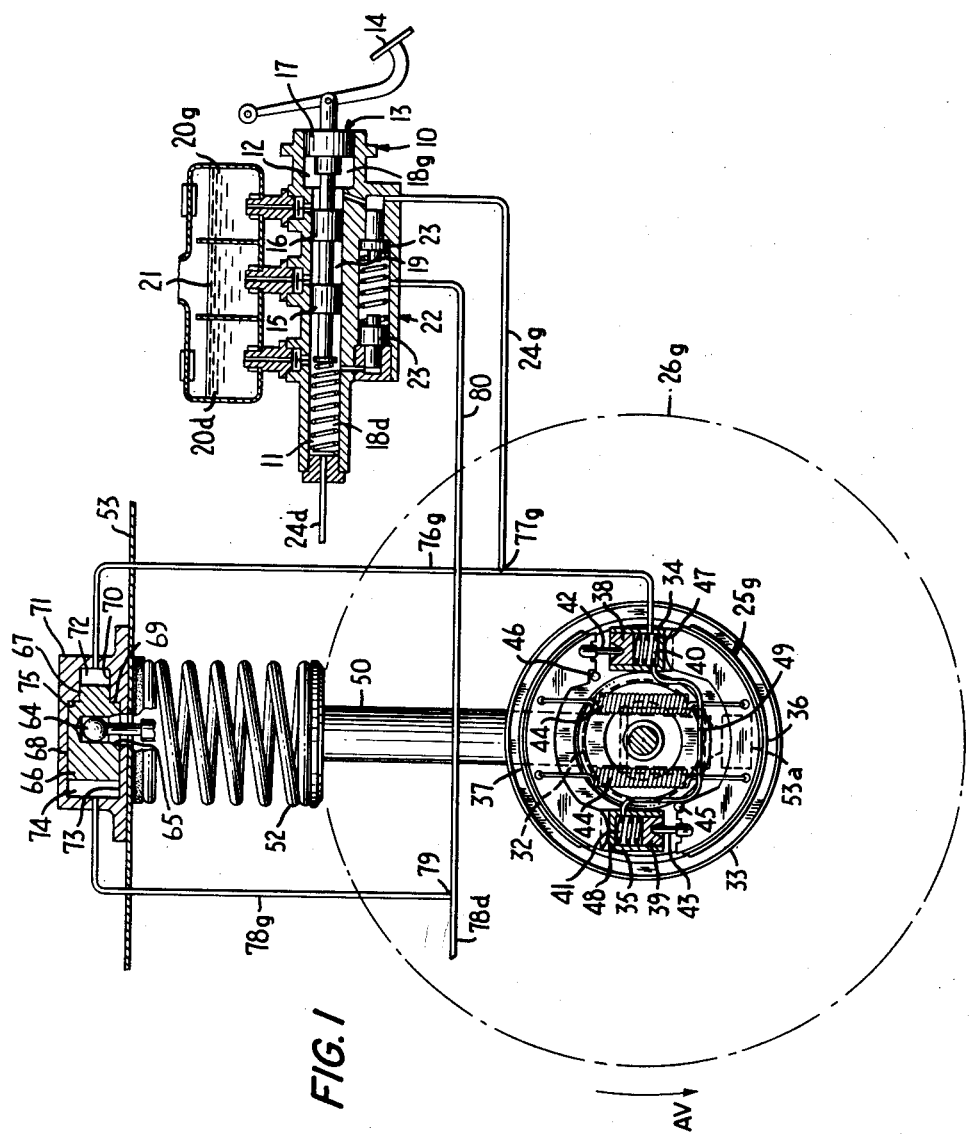
FIG. 1 is a diagrammatic side view of a braking device for an automobile vehicle according to the invention, having brakes of conventional construction.
Figure 3:
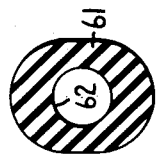
FIG. 3 is a section view of an elastic block for this device, cross-section taken along the line III—III of FIG. 2.
Figure 2:
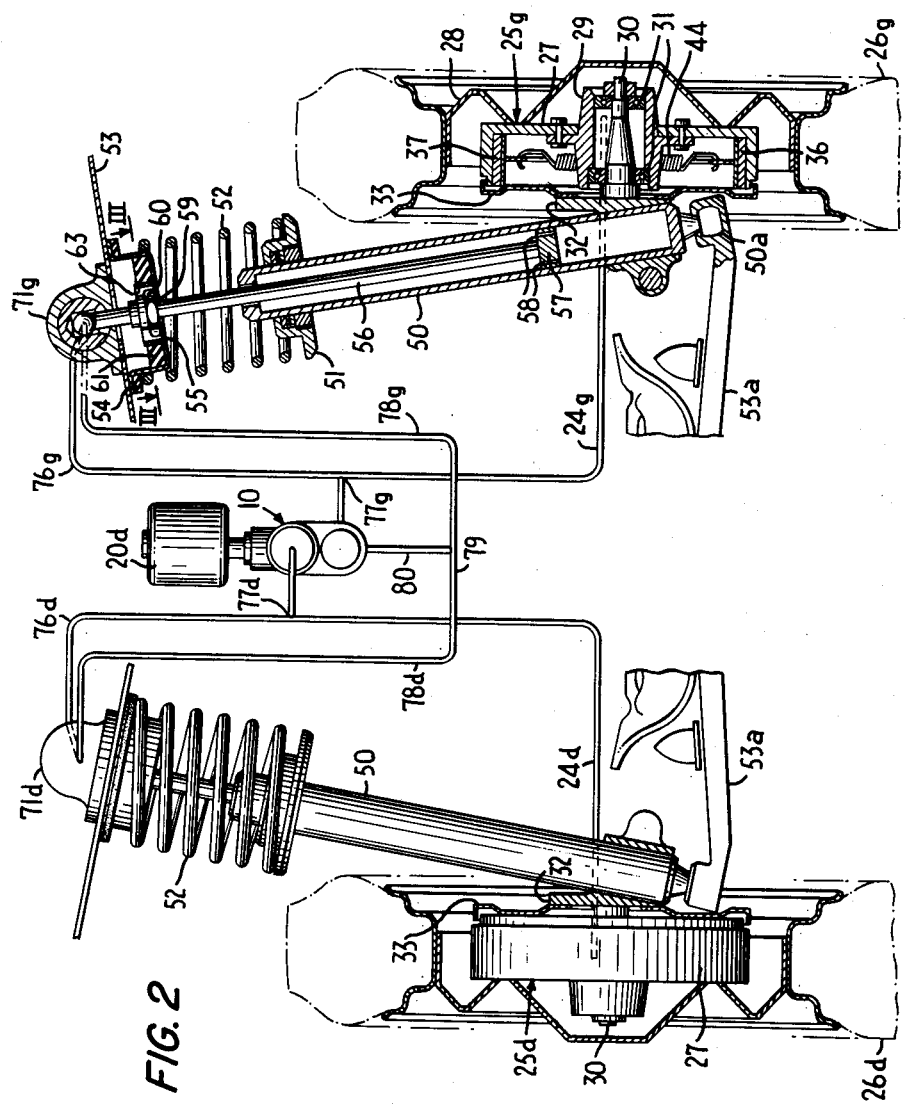
FIG. 2 is a diagrammatic front view of this same device.

Reference will first be made to FIGS. 1 to 3. The master-cylinder 10 which delivers a practically incompressible fluid such as oil, comprises, in the example shown, two cylindrical bores in line: a front bore 11 and a rear bore 12 of larger diameter than the bore 11. In the bores 11 and 12 is mounted a sliding piston 13 actuated by the brake-pedal 14. The unit 13 comprises two pistons 15 and 16 working in the bore 11, and a piston 17 working in the bore 12. At the front of the forward piston 15 is formed a primary chamber 18$d$. Between the pistons 15 and 16 there is formed a secondary chamber 19. Between the pistons 16 and 17 is defined a further primary chamber 18$g$. The various chambers 18$d$, 19 and 18$g$ are connected to reservoirs 20$d$, 21 and 20$g$ through the intermediary of valves actuated by the unit 13. The chambers 18$d$, 19, 18$g$, are further connected to a pressure-comparison device 22 which comprises two opposed pistons 23. When the pressure in the chamber 19 is higher than the pressures in the chambers 18$d$ and 18$g$, the pistons 23 are forced against their respective seats away from each other, so that the pressure in the chamber 18$d$ can be different from the pressure in the chamber 18$g$. On the other hand, when the pressure in the chamber 19 falls to a sufficiently low value, the two pistons 23 are brought mutually closer towards each other or are applied one against the other, and impose an equality of pressures between the pressure in the chamber 18$d$ and the pressure in the chamber 18$g$.

The master-cylinder 10 is arranged in such manner that when the piston 13 is pushed in under the action of the pedal 14, equal volumes of fluid are driven into the chambers 18$d$ and 18$g$, while means are provided, which will be described in more detail later, for developing a high pressure in the chamber 19 in normal operation, so that the pressure in the chamber 18$d$ can be different from the pressure in the chamber 18$g$.

The master-cylinder 10 can be with advantage of the type described in detailed manner in my co-pending application Serial No. 765,808, filed on October 7, 1958 and now Patent 3,044,581.

The chamber 18$d$ is connected to a primary conduit 24$d$ which is coupled, FIG. 2, to the brake 25$d$ of the right-hand front wheel 26$d$ of the vehicle. The chamber 18$g$ is coupled to a primary conduit 24$g$ which is coupled to the brake 25$g$ of the left-hand front wheel 26$g$ of the vehicle.

The brake 25 of each of the wheels 26$d$ and 26$g$ may be of any suitable construction with single or double supply. For example, the brake 25 may be of a usual type as has been shown in FIGS. 1 and 2. The brake 25 comprises a drum 27 which is rigidly fixed to the disc 28 of the wheel. The drum 27 is fixed to a hub 29 in which is engaged the journal 30 through the intermediary of ball bearings 31. The journal or stub-axle 30 is rigidly fixed to a support 32 on which is fixed the brake-plate 33.

The plate 33 carries two cylinders 34 and 35. Against the cylinders 34 and 35 are circumferentially supported two brake shoes 36 and 37 respectively, which extend into the interior of the drum 27 and which are intended to co-operate frictionally with the drum. A piston 38 is slidably mounted inside the cylinder 34 and thus forms a chamber 40, which is connected to the shoe 37 by a coupling-rod 42. In the same way, a piston 39 is slidably mounted in the cylinder 35 to form therein a chamber 41, and is connected to the shoe 36 by a coupling-rod 43.

Return springs 44 act between the shoes 36 and 37, and tend to hold the brake in an inoperative or rest position in which the shoe 36 is applied against a stop 35 fixed on the plate 33, while the shoe 37 is held against a stop 46 fixed to the plate 33. In the chambers 40 and 41 are arranged springs 47 and 48 respectively, which are weaker than the springs 44, and the function of which is to hold the pistons 38 and 39 and the coupling rods 42 and 43 in the position of rest.

The chamber 40 of the brake of the right-hand wheel 26$d$ is coupled to the conduit 24$d$, while the chamber 40 of the brake of the left-hand wheel is coupled to the conduit 24$g$. In each of the brakes, a conduit 49 couples the chamber 41 to the chamber 40.

Two tubular uprights 50 respectively couple the two wheel supports 32 to the chassis 53. Each tubular upright 50 is rigidly fixed at its lower extremity to the support 32, and is articulated by a swivel 50$a$ to a transverse bar 53$a$ coupled to the chassis 53. At its upper extremity, the upright 50 carries a cup 51, on which is supported a helicoidal suspension spring 52. At its other extremity, the spring 52 supports the chassis 53 of the vehicle through the intermediary of a joint 54 and a cup 55. A rod 56 is engaged in the tubular upright 50 and is provided at its lower extremity with a piston 57 which is slidably mounted inside the upright 50. The piston 57 is provided with dash-pot orifices 58 in such manner that the assembly 50–56 forms a suspension shock-absorber.

The rod 56 passes out of the upper portion of the upright 50 and extends axially through the spring 52. The rod 56 passes through a hole 59 in the cup 55 and has a projection 60 disposed adjacent to the cup. Inside the cup 55 is mounted a block of elastic material 61 which has an elongated shape in the longitudinal direction of the vehicle (see FIG. 3) and which has a circular central hole 62 which receives an edge 63 enclosing the projection 60 (FIG. 2).

The upper extremity of the rod 56 is formed, FIG. 1, by a swivel 64 engaged in a housing 65 which is formed in a piston 66. This piston has a small diameter portion 67 and a portion 68 of large diameter, separated by a shoulder 69. The portion 67 is slidably engaged in a bore 70 of a cylinder 71 and therein defines a chamber 72. The portion 68 is slidably engaged in a bore 73 of the cylinder 71 so as to form a chamber 74. The shoulder 69 is intended to come into abutment with a shoulder 75 which separates the two bores 70 and 73 in the cylinder 71. The cylinder 71 is mounted on the chassis 53. 71$d$ represents the cylinder corresponding to the right-hand wheel 26$d$, and 71$g$ represents the cylinder corresponding to the left-hand wheel 26$g$ (see FIG. 2).

The chamber 72 of the cylinder 71$d$ is connected to a conduit 76$d$ which is coupled at 77$d$ on the primary conduit 24$d$, whereas the chamber 72 of the cylinder 71$g$ is coupled to a conduit 76$g$ which is connected at 77$g$ to the primary conduit 24$g$.

The chamber 74 of the cylinder 71$d$ is connected to a conduit 78$d$ and the chamber 74 of the cylinder 71$g$ is connected to a conduit 78$g$. The two conduits 78$d$ and 78$g$ are connected at 79 to a common conduit 80 which is coupled to the secondary chamber 19 of the master-cylinder 10.

When the pedal 14 is depressed to apply the brakes, substantially equal volumes of fluid are driven through the primary conduit 24$d$, and through the primary conduit 24$g$. The fluid in the conduit 24$d$ causes an increase in the volume of the chambers 40 and 41 of the brake of the wheel 26d, and, through the intermediary conduit 76d, an increase in the volume of the chamber 72 of the cylinder 71d. In the same way, the fluid in the conduit 24g causes an increase in the volume of the chambers 40 and 41 of the brake of the wheel 26g and, through the conduit 76g, an increase in the volume of the chamber 72 of the cylinder 71g.

This results in an expansion of the shoes 36 and 37 of the two wheels, and at the same time slight forward movements of the pistons 66 in the cylinder 71d and 71g. Immediately after this approach phase of the shoes, braking reactions are produced on the two wheels which, in the case of the braking or forward movement tend, through the intermediary uprights 50 having pivotal supporting points at 50a, to cause the pistons 66 to travel forward in the cylinders 71d and 71g, that is to say in the same direction as the action of the primary pressures in the chambers 72.

Such forward movements of the pistons 66 in the cylinders 71d and 71g are limited by the cushions of fluid which are formed in the chambers 74, and which communicate through the conduits 78d and 78g with the closed chamber formed by the conduit 80 and the chamber 19, this having the effect of producing a single secondary pressure inside this chamber. This reaction or secondary pressure is higher than either of the primary pressures.

The chamber 72 of each of the cylinders 71d and 71g permits, by its sensitivity to the position of the pistons 66, of a modulation of the corresponding primary pressure in the conduit 24d or 24g, that is to say in the chambers 40 and 41 of the two wheels, which ensures an excellent balancing in all circumstances, as will now be seen. At the same time, the chamber 72, known as the compensating chamber, permits a small reaction to be applied on the chassis in the direction of braking, in response to the movement of the pistons 66.

In the case where the conditions of operation are the same on both wheels, for example if it happens that, at the moment of braking, the coefficient of friction of the linings is exactly the same for the two wheels, the forces are symmetrical in pairs as between the right-hand and left-hand brakes, and the two primary pressures are equal. The two pistons 66 of the two brakes then take-up exactly symmetrical positions.

In general, the coefficients of friction will not be exactly the same for the two brakes and may be slightly different from one brake to the other, while furthermore being variable in more or less considerable proportions.

For example, if at the moment of braking, the coefficient of friction of the linings 36 and 37 is higher on the right-hand side than on the left, the piston 66 of the cylinder 71d has a tendency to carry out a small movement forward and, through the intermediary enclosed space 74—78d—80—78g—74, to force the piston 66 of the cylinder 71g to carry out a small equal movement towards the rear.

During the course of these small movements, since the primary pressure applies at primary conduits 24d, 24g in each brake, by virtue of the compensating chamber 72, a small reaction in the direction of braking, small variations in capacity appearing in the chambers 72 and in consequence in the primary circuits 24g, the capacity available for the oil of the right-hand primary circuit 24d increases by a small amount, and the capacity available to the oil of the left-hand primary circuit diminishes by the same small amount.

As the volumes of oil enclosed in the circuits 24d and 24g are invariable, because the master-cylinder 10 has forced into them equal volumes of fluid and because furthermore all communication between these circuits is prevented, these small variations of capacity produce inverse variations of pressures. The primary pressure on the right-hand side thus becomes smaller than the primary pressure on the left-hand side.

By virtue of this arrangement, excellent balancing of the braking is obtained. In addition, since oil is a non-compressible fluid, very large variations of pressure are produced by very small variations of capacity. This enables the piston 66 of each of the two brakes to be given a very stable position of equilibrium, very close to the exactly symmetrical position, and this is true irrespective of the values of the two primary pressures and the secondary pressure.

If, during forward running, one of the conduits such as 80, 78d and 78g happened to break, the pistons 66 would come into abutment against the cylinders 71 towards the left-hand side of FIG. 1, and the two pistons 23 would come into contact with each other, while ensuring an equilization of the primary pressures and maintaining a balance which, while it may not be so good as the previous case, is at least up to the usual standard.

The primary conduits 24d and 24g are preferably made in such manner as to prevent any rupture which would be followed by an unbalancing effect. With a view to providing complete safety, one of the chambers 40 or 41 could be connected to the secondary conduits 78d and 78g instead of the conduit 24d or 24g.

During reverse running, the braking reactions have a tendency to apply the pistons in abutment at 75 against the cylinder 71. The pistons 23 mutually approach each other, which applies a small pressure in the secondary circuit, whereas the primary pressures are maintained in equilibrium. The braking is effected by expansion of the shoes 36 and 37 under the action of the primary pressures at 24d and 24g.

Figure 4:
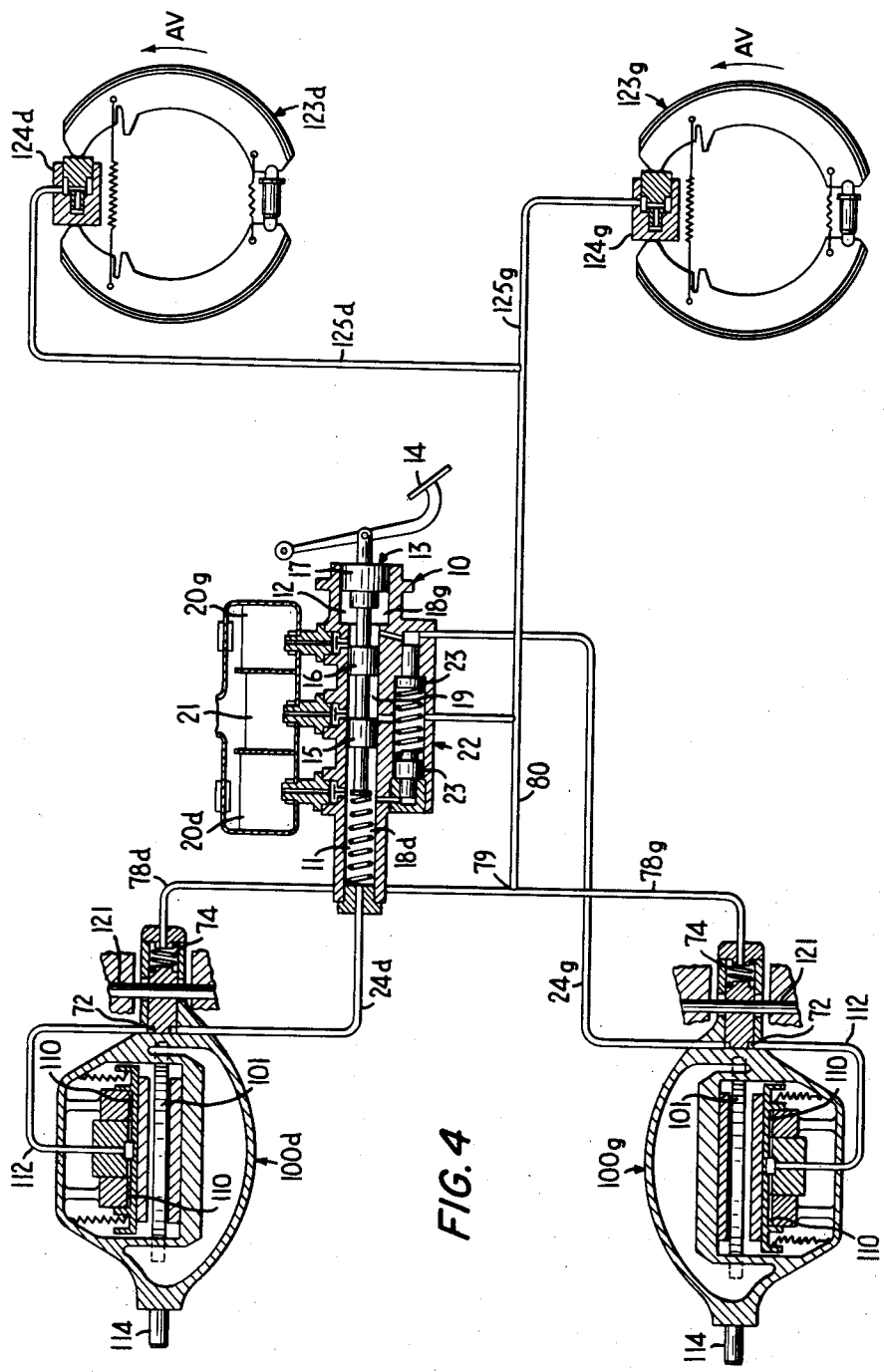
FIG. 4 is a diagrammatic view of an alternative form of the braking device applied to an automobile vehicle in which the front brakes are of the disc type.
Figure 5:
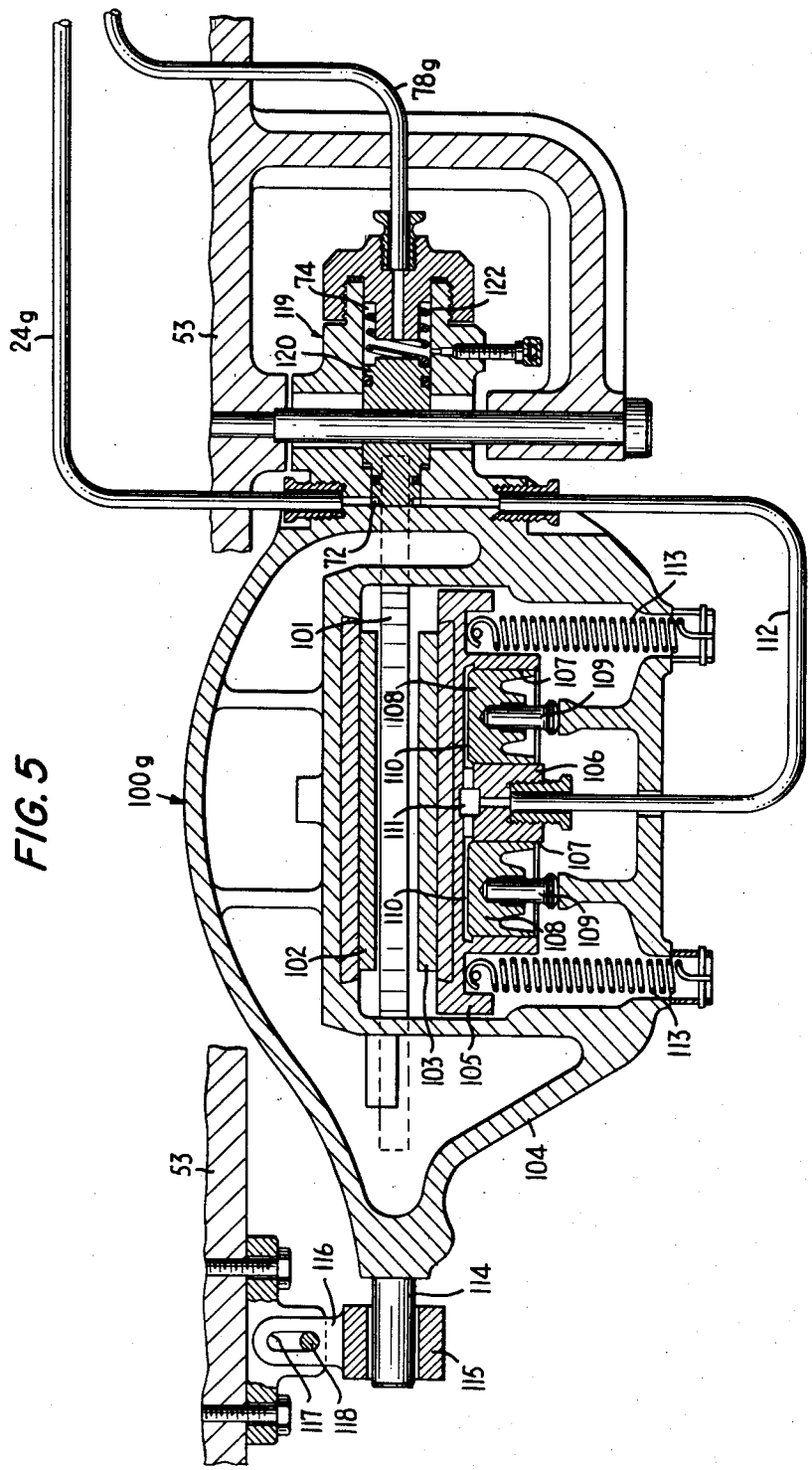
FIG. 5 is a view in plan to a larger scale of a disc brake provided with the device of FIG. 4.

Reference will now be made to FIGS. 4 to 6, which are concerned with an application of the invention to an automobile vehicle having disc brakes on the front wheels. The master-cylinder 10 is similar to that which has been described with reference to FIGS. 1 to 3.

Each disc brake, 100d right-hand or 100g left-hand is composed of a disc 101 which is rigidly fixed to the wheel 26d or 26g, and the upper portion of which is intended to be gripped in a transverse direction between two small friction plates 102 and 103. The plate 102 is fixed in a support 104, while the plate 103 is fixed to a plate 105 which is slidably mounted on the support 104 in a direction parallel to the axis of the disc 101. The plate 105 is provided with a boss 106 in which are formed two bores 107. In each of the bores 107 is engaged a fixed piston 108 which is coupled to the support 104 by a small pillar 109.

The pistons 108 define in the bores 107 actuating chambers 110 which are connected at 111 to a conduit 112 supplied from the primary conduit 24d or 24g relative to the corresponding wheel. Restoring springs 113 are coupled between the friction plate 105 and the support 104 and tend to force the plate 103 away from the disc 101. When the primary pressure is admitted from the conduit 112 into the chambers 110, the action of the springs 113 is overcome and the plate 105 pushes the small plate 103 and applies it against the disc 101 which is thereby gripped between the small plates 102 and 103.

The support 104 is coupled to the chassis 53 in such manner that it can be slightly displaced with respect to the chassis in the longitudinal direction of the vehicle. At its front extremity, the support 104 is provided with a spindle 114 which is engaged in a sleeve 115 provided with a fork 116. Elongated ports 117 are formed in the two branches of the fork 116 and are engaged on a vertical shaft 118 rigidly fixed to the chassis 53.

At its rear extremity, the support 114 has a cylinder 119 in which a piston 120 is slidably mounted. The piston 120 carries a transverse shaft 121 which is fixed to the chassis 53. The piston 120 forms at the front the primary compensating chamber 72 which is coupled to the conduits 112 and 24d or 24g, and at the rear the secondary chamber 74 which is coupled to the conduit 78d or 78g. A small spring 122 is preferably provided in the chamber 74 so as to give the moving system a definite position of rest.

The assembly is such that the latitude of movement is greater at the front extremity than at the rear extremity, in order that when the disc 101 is gripped between the plates 102 and 103, the braking reaction is absorbed by the shaft 121 carried by the piston 120, and not by the shaft 118.

In the example of FIG. 4, the secondary circuit 80 serves in addition to supply the rear brakes 123d and 123g, which are of the self-releasing drum type with a brake cylinder 124d or 124g with a single supply in the direction opposite to the direction of rotation of the drum for forward running AV, by conduits 125d or 125g coupled to the conduit 80. It will be understood that such an arrangement of rear brakes could also be adopted in the example of FIGS. 1 to 3.

The operation of the device of FIGS. 4 to 6 is similar to that which has been described with reference to FIGS. 1 to 3. When the pedal 14 is depressed to apply the brakes, equal volumes of fluid are driven through the conduits 24d and 24g, which results in an increase in the volume of the chambers 110 and ensures the braking of the discs 101. The braking reaction produces forward movements of the supports 104 which are limited by the cushions of oil in the chambers 74, while the secondary pressure is established. As in the previous case, the compensating chambers 72 enable the primary pressures in the primary circuits 24d and 24g and in the chambers 110 to be modulated, which ensures an excellent balancing for the same reasons as those indicated above with reference to FIGS. 1 to 3. It will be observed that the rear brakes 123d and 123g are actuated by the secondary pressure of the circuit 80.

Figure 8:
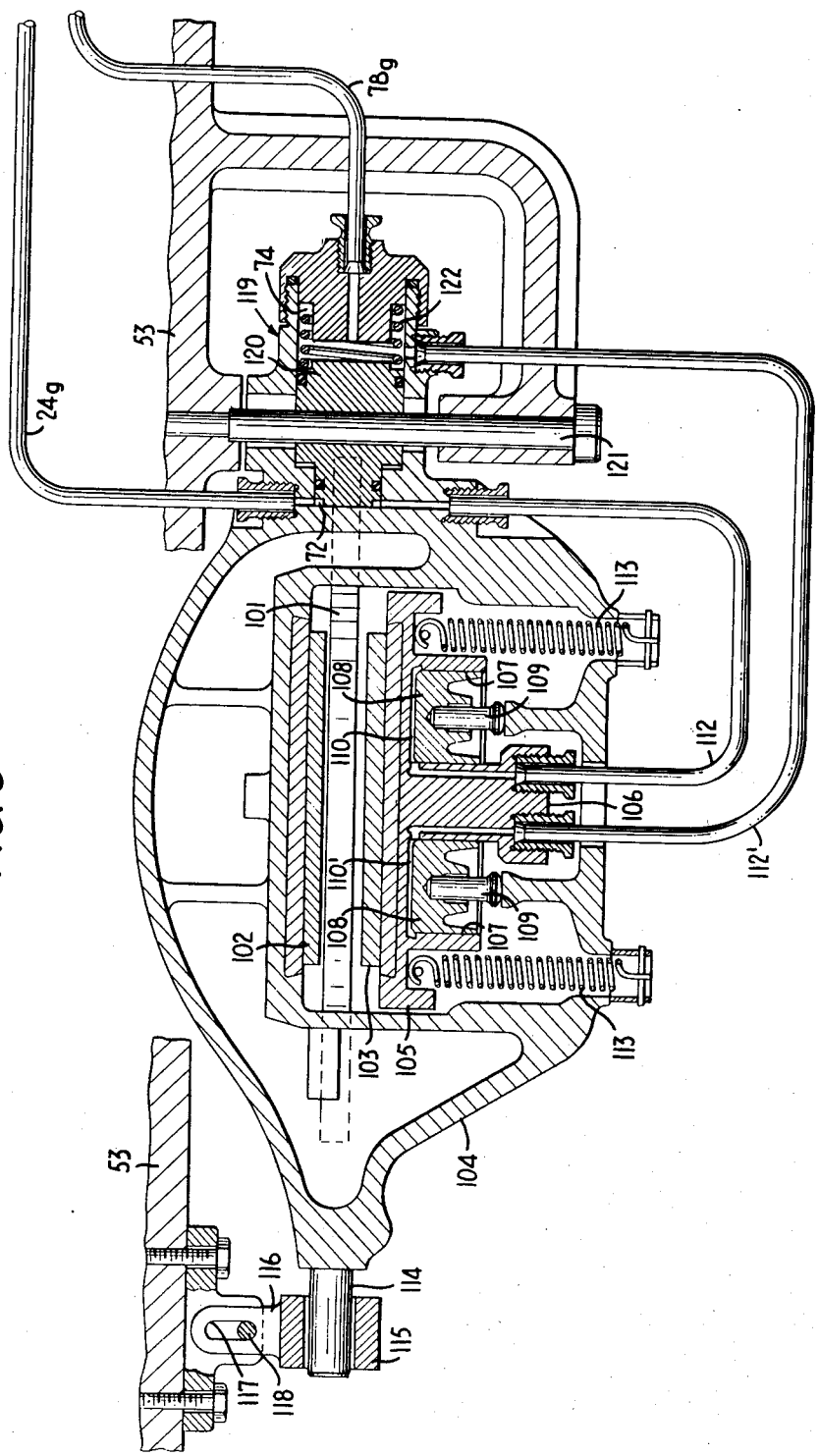
FIG. 8 is a plan view, on a larger scale, of a disc brake fitted with the device of FIG. 7.

In the alternative form of the invention shown in FIGS. 7 to 9, the arrangement is similar to that of FIGS. 4 to 6, and the same reference numbers have been adopted to represent similar parts.

In this case, only one of the two chambers 110 is supplied by the conduit 112 coupled to the primary conduit 24d or 24g. The other chamber, designated by 110', is supplied by a conduit 112' coupled to the secondary circuit 80, and preferably through the intermediary coupling to the chamber 74.

The operation is substantially the same as that described with reference to FIGS. 4 to 6, but in this case the gripping of the discs 101 is made more powerful by the contribution of the secondary pressure in the chambers 110'. In addition and in particular, a balanced braking is maintained even if one of the primary conduits 24d or 24g happens to break.

Figure 10:
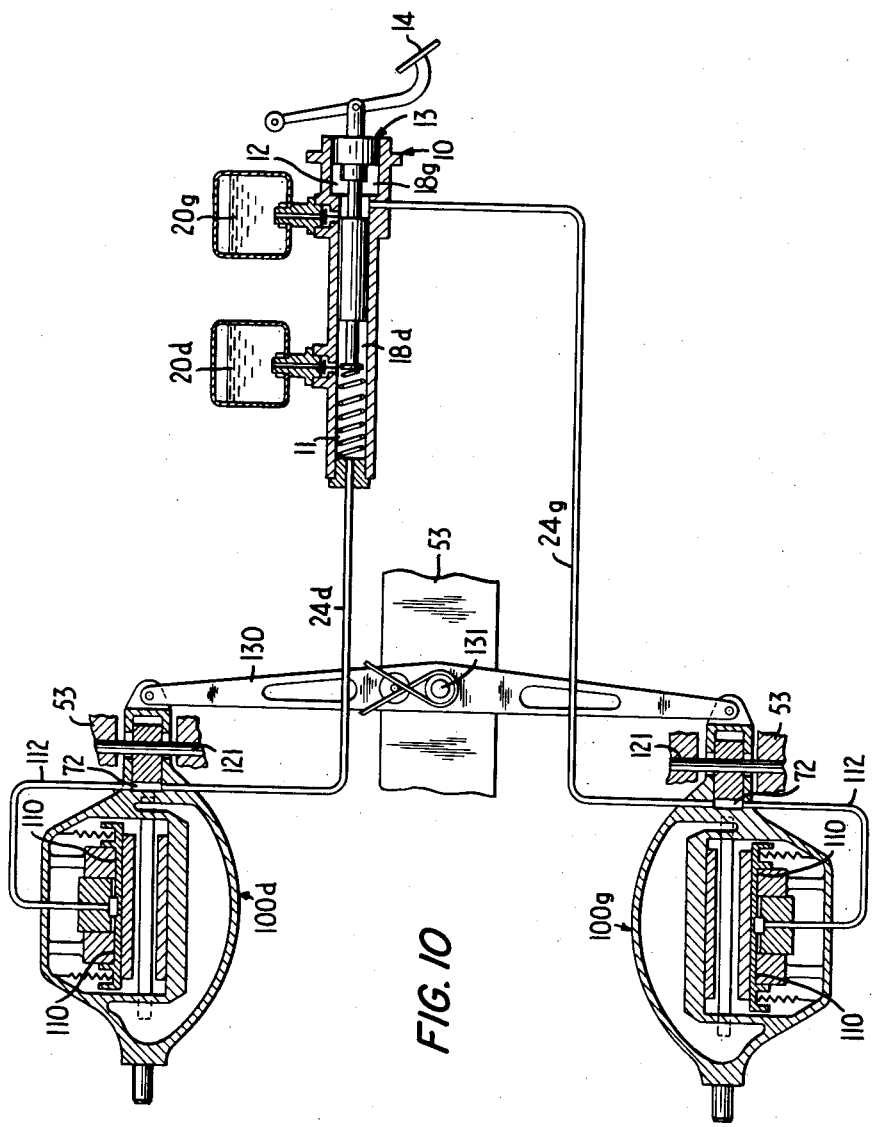
FIG. 10 is a diagrammatic view of still another alternative form.

In a further alternative form shown in FIG. 10, the arrangement is again similar to that of FIGS. 4 to 6, but in this case the secondary circuit is replaced by a mechanical compensating bar 130 which is pivoted at 131 on the chassis 53, and of which the extremities 132 are articulated on the supports 104. There can again be seen at 72 the primary compensating chambers which, together with the chambers 110, are coupled to the primary conduits 24d and 24g. The master-cylinder 10 is similar to that of FIG. 4 in that it is arranged to drive equal volumes of fluid into the conduits 24d and 24g, but it is not provided with secondary elements such as the chamber 19 and the device 23.

The operation of the device of FIG. 10 is similar to that which has been previously described.

What I claim is:

1. A braking system for two wheel brakes of an axle of an automobile vehicle having a chassis, said braking device comprising two supports movably mounted with respect to the chassis, two supporting means mounting said two supports for movement on said chassis in two predetermined direction, balancing means connected to each support and responsive to the movement of said supports operable to make all displacements of any one support with respect to said chassis equal and opposite to the other, two rotating members each rotatably driven by a respective wheel, two friction means carried by each of said two supports for co-operating frictionally in operation with said two rotating members respectively, means defining two brake-cylinders carried by each of the two supports for controlling said two friction elements respectively, said supports being movable relative to the chassis cooperatively with said balancing means in response to gripping action of said friction means on the rotating members, two supply conduits each coupled to one of said means defining two brake cylinders respectively, each of said balancing means comprising a compensating chamber coupled to one of said conduits respectively, the means defining each compensating chamber having two members comprising a cylinder and a piston slidably mounted in said cylinder, one of said members defining each of said compensating chambers being coupled to the chassis and the other to a corresponding one of said two supports, and a master-cylinder having means operable selectively to deliver substantially equal volumes of fluid into said conduits.

2. A braking system according to claim 1, further including a backing plate for each wheel, an elongated tubular member defining a cylinder fixed to said back plate and closed at one end, an arm coupled to said chassis, means articulating said closed end of said tubular member with said arm comprising a swivel joint, a dash pot in said tubular member comprising a piston slidable in said tubular member having means defining said dash pot, a piston rod connected to said piston and extending longitudinally in said tubular member and axially outwardly thereof, said rod having an upper end connected to one of said two members defining a respective compensating chamber, and a suspension spring disposed between the vehicle chassis and an upper extremity of said tubular member.

3. A braking system according to claim 1, in which each of said rotating members comprises a rotationally driven disc and in which one of said friction elements of each brake is mounted stationary on a respective support, means mounting the other friction element of each brake opposed to said one friction element and for actuation by a respective one of said brake cylinders in response to supply of fluid thereto upon actuation of said master-cylinder for supplying fluid to said two conduits and for actuation toward and away from said one friction element, said rotationally driven disc of each brake being disposed between said two friction elements for selective engagement thereby in response to actuation of said other friction element.

4. A braking system according to claim 3, in which each of said supports is mounted for forward and rearward movement relative to the chassis and in which each of said supports comprises means defining the cylinder defining a respective compensating chamber, and said piston of said compensating chamber of each brake comprising a shaft fixed relative to the chassis and disposed transverse to the direction of movement of a respective support.

5. A braking system according to claim 2, in which in each brake said cylinder and piston defining said compensating chamber jointly define an opposed end of said piston a secondary chamber in said balancing means, and further comprising a hydraulic circuit cross connecting the secondary chambers of said brakes and including connections for rendering a fluid pressure developed in said secondary chambers upon application of the brakes effective for equalizing the effective braking forces applied at each brake.

6. A braking system according to claim 2, in which said balancing means comprises two members defining a secondary chamber, one of said members comprising a secondary cylinder and the other a secondary piston means connecting one of the last mentioned members to the chassis and the other to a corresponding support for causing relative movement between said members, said system further comprising a hydraulic circuit cross connecting the secondary chambers of both brakes and including connections for rendering fluid pressure developed in said secondary chambers upon application of the brake effective for substantially equalizing the effective braking forces applied by the two brakes.

7. A braking system for two wheel brakes of an axle of an automoblie vehicle having a chassis, said braking device comprising two supports movably mounted with respect to the chassis, a supporting balancing bar pivotally mounted on said chassis and connected to said supports for movement of said supports operable to make all displacements of anyone support with respect to said chassis equal and opposite to the other, two rotating members driven rotationally from the two wheels respectively, two friction means carried by each of said two supports for co-operating frictionally in operation with said two rotating members respectively, means defining two brake-cylinders carried by each of the two supports for controlling said two friction elements respectively, said supports being movable relative to the chassis cooperatively with said supporting balancing bar in response to gripping action of said friction means on the rotating members, two supply conduits each coupled to one of said two brake-cylinders respectively, means defining two compensating chambers respectively coupled to said conduits, the means defining each compensating chamber having two members comprising a cylinder and a piston slidably mounted in said cylinder, one of said members defining each of said compensating chambers being coupled to the chassis and the other to a corresponding one of said two supports, and a master-cylinder having means operable selectively to deliver substantially equal volumes of actuating fluid into said conduits.

References Cited in the file of this patent
UNITED STATES PATENTS

| | | |
|---|---|---|
| 2,289,907 | Friedlaender | July 14, 1942 |
| 2,395,072 | Sauer | Feb. 19, 1946 |
| 3,033,324 | Lepelletier | May 8, 1962 |
| 3,044,581 | Lepelletier | July 17, 1962 |